United States Patent

[11] 3,633,872

| [72] | Inventor | Joseph F. Wright<br>Houston, Tex. |
|---|---|---|
| [21] | Appl. No. | 879,059 |
| [22] | Filed | Nov. 24, 1969 |
| [45] | Patented | Jan. 11, 1972 |
| [73] | Assignee | FMC Corporation<br>San Jose, Calif. |

[54] BUTTERFLY VALVE
3 Claims, 6 Drawing Figs.

[52] U.S. Cl. ................................................. 251/306
[51] Int. Cl. .................................................. F16k 1/22
[50] Field of Search ........................................ 137/375, 454.2; 251/173, 306, 307, 308

[56] References Cited
UNITED STATES PATENTS

| 3,314,642 | 4/1967 | Kautz et al. | 251/307 |
| 3,334,650 | 8/1967 | Lowrey et al. | 137/375 |
| 3,336,938 | 8/1967 | Schenck | 137/375 |
| 3,338,551 | 8/1967 | Black | 251/306 |
| 3,341,170 | 9/1967 | Housworth | 251/306 |
| 3,356,336 | 12/1967 | Maenaka | 251/306 |

*Primary Examiner*—Henry T. Klinksiek
*Attorneys*—F. W. Anderson and C. E. Tripp ABSTRACT: A butterfly valve having a replaceable seat assembly of resilient sealing material received in annular mounting grooves. The seat assembly includes bonded backup segments in the areas where the butterfly stem passes through the seat and secondary seals in the backup segments to prevent leakage around the stem. The method of seal construction permits simplified seal removal and replacement, especially advantageous in large diameter valves.

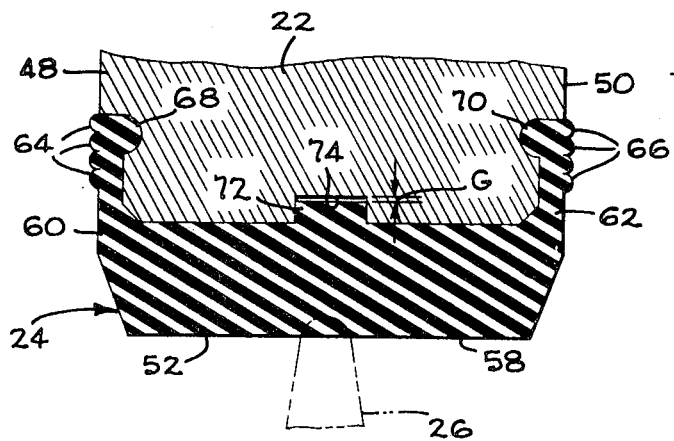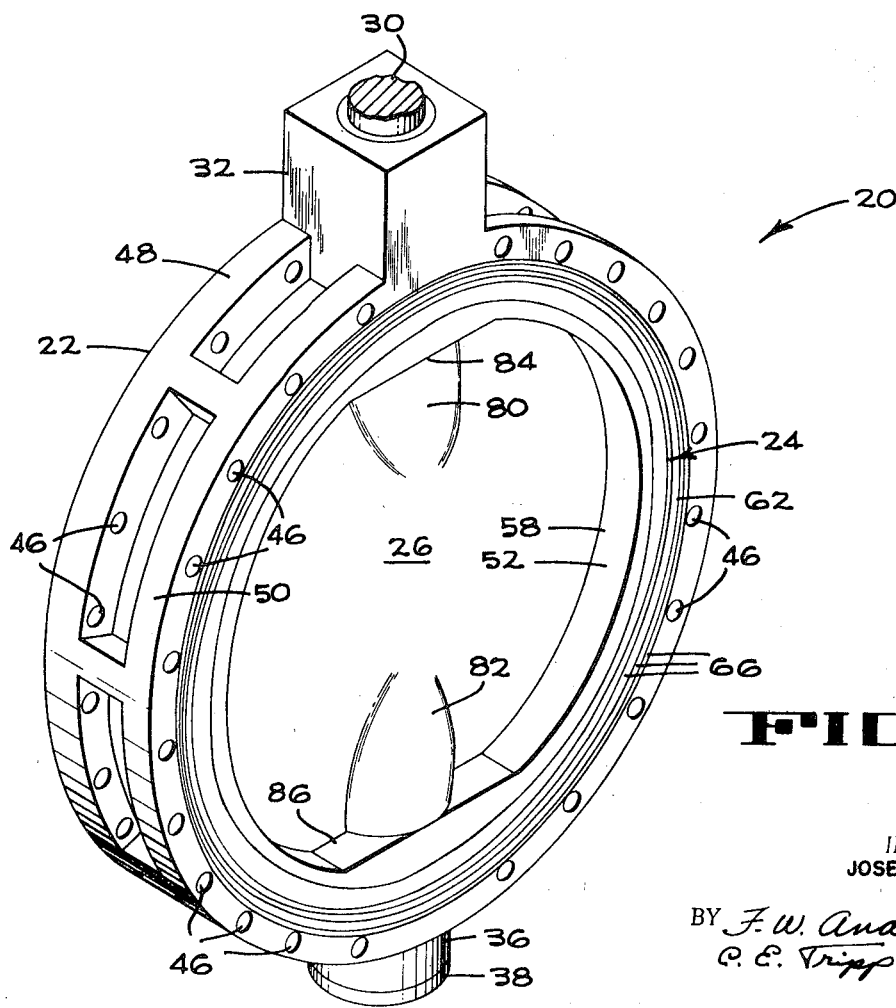

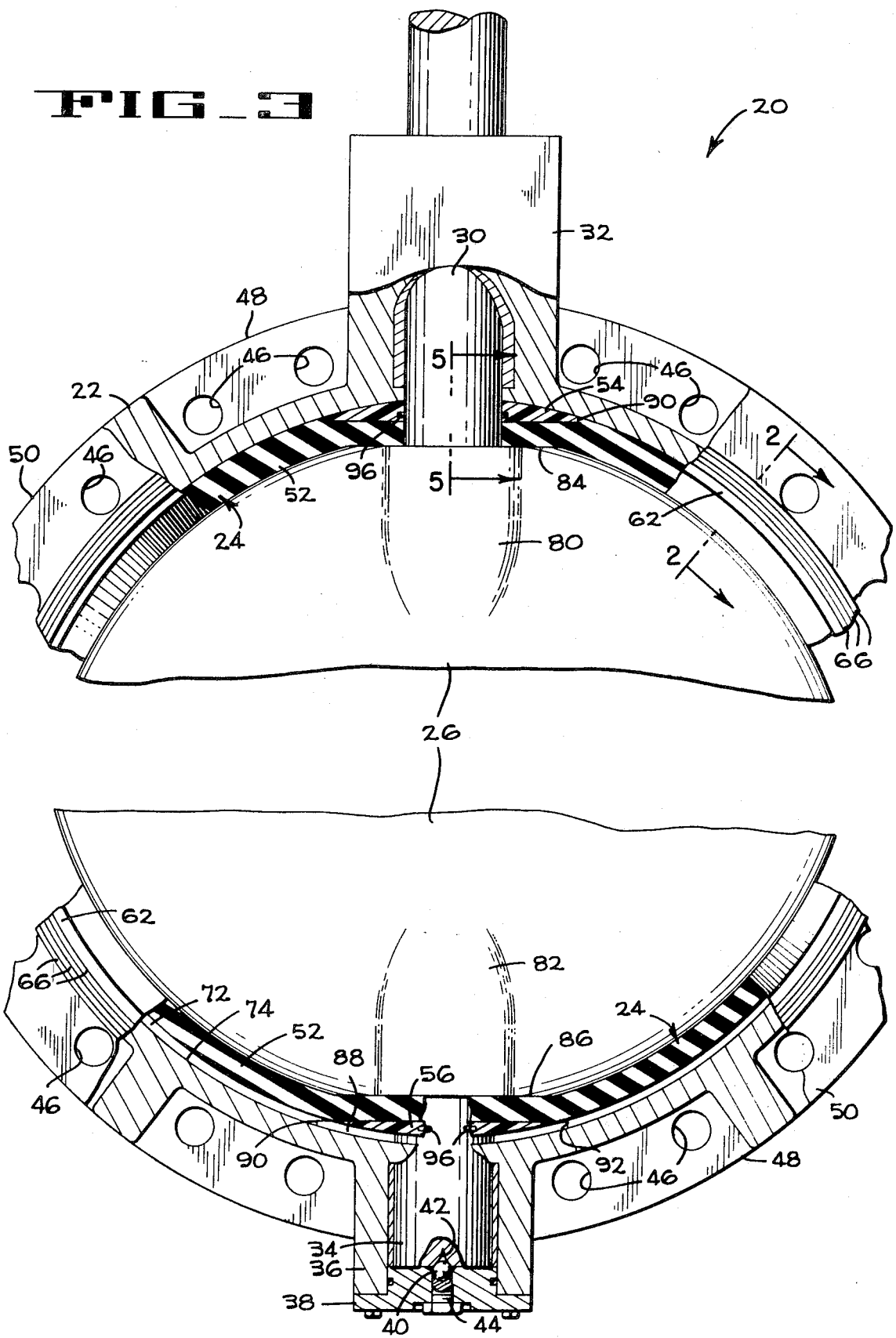

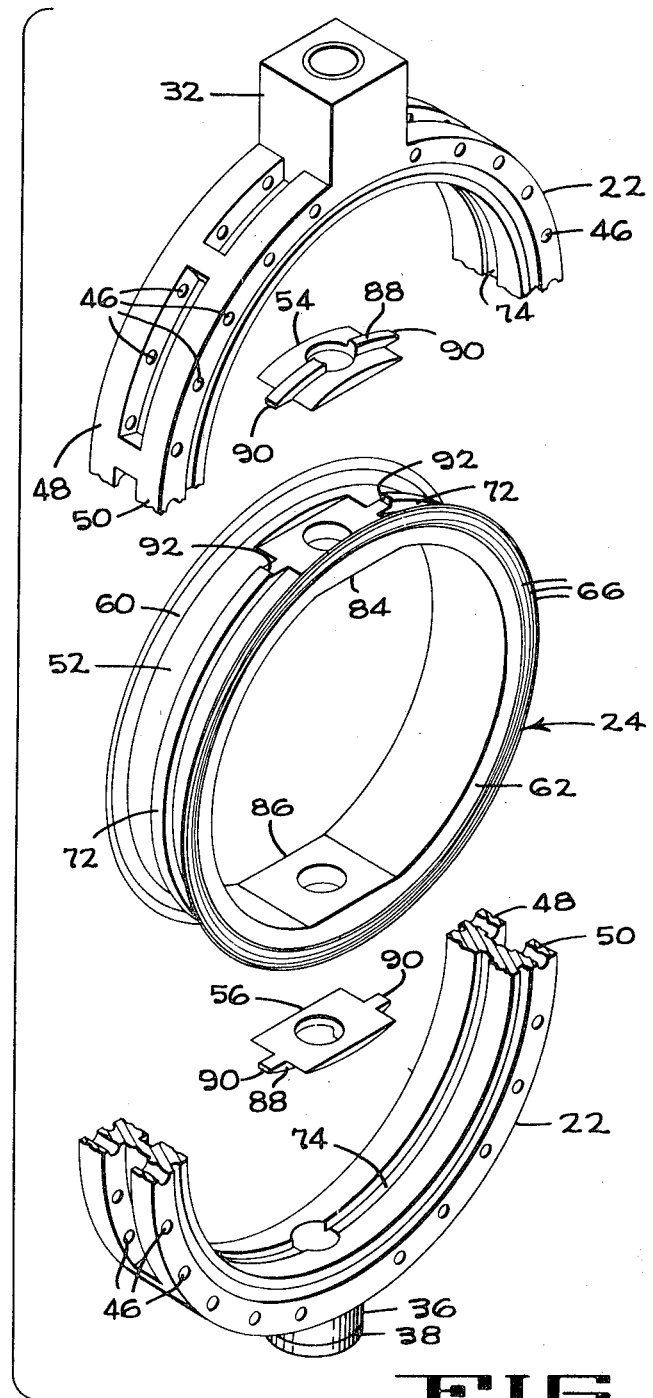
FIG_4

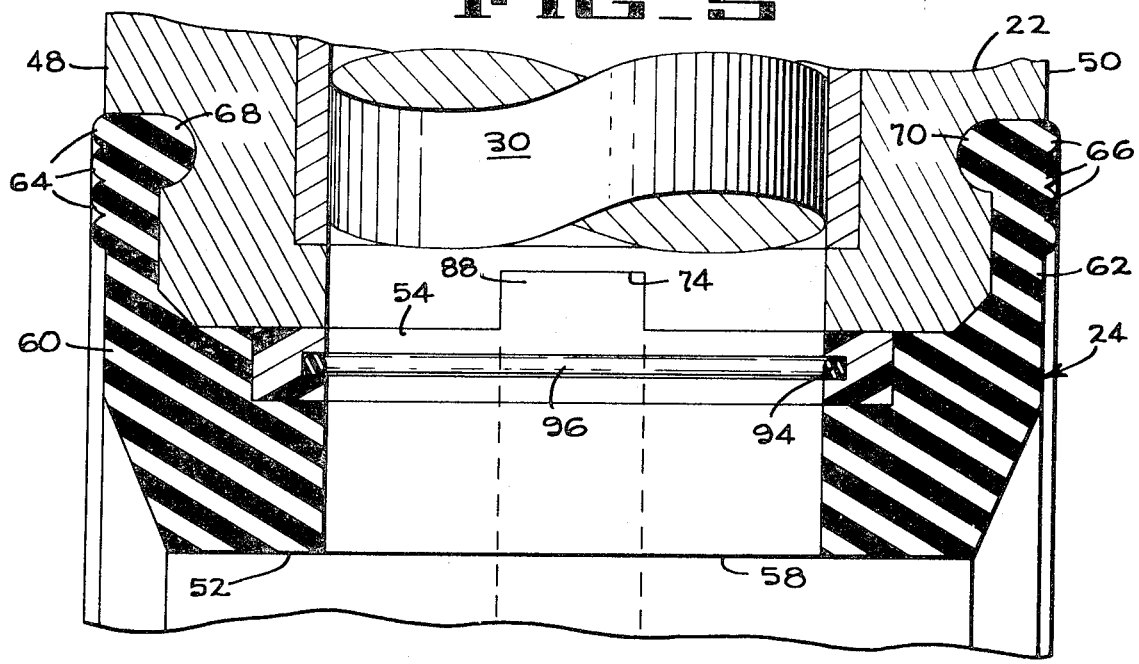
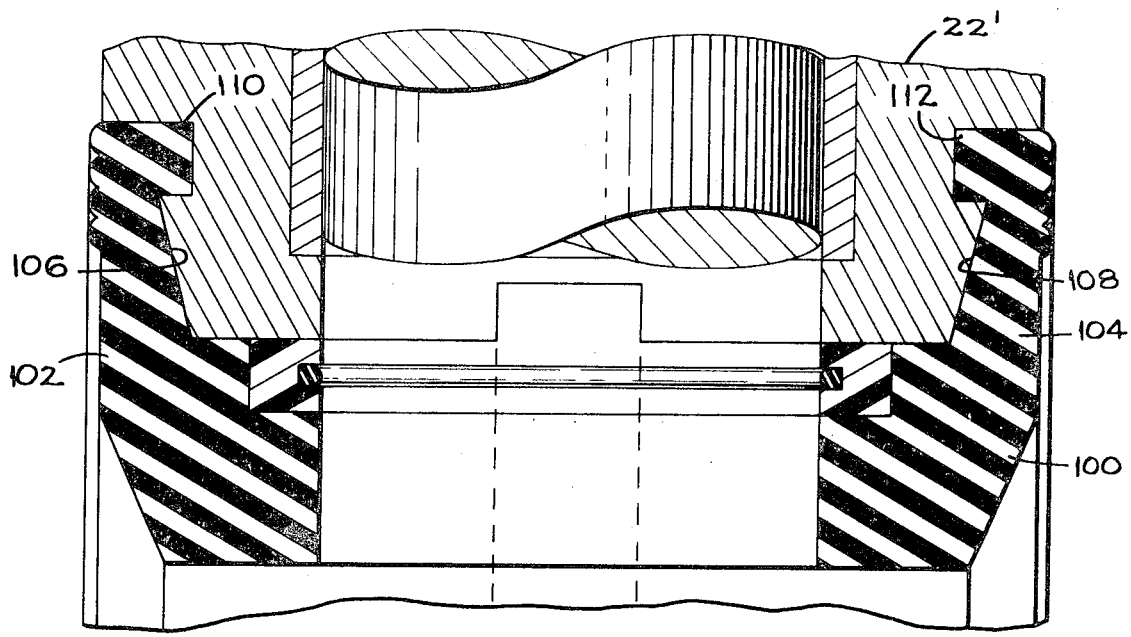

BUTTERFLY VALVE

BACKGROUND OF THE INVENTION

1. Field of the Invention

The present invention pertains to a butterfly valve having a replaceable seat assembly, and more particularly to an improved seat construction that prevents leakage in the stem area and is easier to remove and replace.

2. Description of the Prior Art

Houseworth U.S. Pat. Nos. 3,420,498 and 3,341,170 disclose a replaceable butterfly seat assembly comprising a resilient seat bonded to a two-piece rigid backup retainer (FIG. 8). To install the seat assembly it is diametrically compressed, the resilient seat material at 78 between the end faces of the retainers permitting sufficient compression to allow insertion of the seat assembly in the valve body.

Trefil et al. U.S. Pat. No 3,263,960 illustrates a replaceable seal having a central annular rib that is received in an annular groove in the valve body. Also disclosed are multiple sealing rings on the outward faces of the seal that engage the pipeline flanges forming a seal between the valve body and pipeline.

One of the primary causes of value failure is seat ballooning which can be described as a swelling or an inward radial expansion of the resilient seat. This condition occurs most commonly on seats which basically comprise a soft elastomer and are not supported by a hard seat backup or an elastomeric reinforcement. While ballooning is usually caused by a pressure leakage to the area between the seat and the valve body, usually caused by a stem seal failure, it can also be caused by high-velocity flow or a high-vacuum service as well as by any combination of these factors.

Ballooning itself is not necessarily harmful, but due to this condition the seat can be distorted to such a degree that the disc will tear the seat or cause an accelerated rate of wear, when the disc is rotated between the open and closed positions.

SUMMARY OF THE INVENTION

The butterfly valve of the present invention overcomes certain disadvantages of the prior art valves which should be noted. One of the primary caused of valve failure is ballooning of the valve seat as previously discussed. Therefore, one of the objects of the present invention is to eliminate this condition by providing cooperating lugs on the radial flanges of the resilient seat that engage corresponding circular grooves in the mounting flanges of the valve body.

Shaft leakage, another cause of seat ballooning is prevented by the employment of a rigid backup segment in the areas where the valve stem passes through the resilient seat. In addition to providing a rigid mounting of an O-ring that acts as a secondary seal, the segments limit the distortion of the seat about the shaft that is caused by the torsional friction between the shaft and the resilient seat. In the present invention, rigid backup segments that are bonded to the resilient seat in these areas, minimize the deflection of the seat. The backup segments each have an upstanding rib that engages the bedgroove and transmits the torsional forces to the valve body.

The rigid backup segments provide an additional advantage in that they permit the thickness of the seat to be maintained uniform thereby providing uniform seat compression when the seat is engaged by the flattened portions of the valve disc. This feature results in uniform pressure retention capabilities and eliminates leakage downstream and behind the valve seat.

Another problem commonly experienced is distortion or flowing of the resilient seat caused by the disc during closing of the valve and distortion of the seat when the disc is in the open position under high-velocity flow. These conditions are prevented by a further feature of the invention in which an annular rib on the seat and a corresponding bedgroove are provided in the valve body. The sides of the rib are tightly fitted to the groove, preventing distortion of the seat in either direction along the axis of fluid flow. In addition, a gap is provided between the end of the rib and the bottom of the bedgroove to permit expansion of the resilient seat into the groove, reducing distortion and flow of the seat material as the disc displaces the seat material in closing.

An important criteria in valve design is ease of replacement of the seat, since the life of the valve body is very long and the resilient seats, i.e., rubber, inherently have a relatively short life. Especially in large diameter valves, the force required to sufficiently compress the rigidly backed type seals is excessive for field replacement without special installation tools. This problem is solved in the present invention by providing a seat having backup segments only in critical areas so that little compressive force is required to deflect the seat a sufficient amount for easy installation. These together with other objects and advantages will become apparent upon reference to the following drawings and description.

BRIEF DESCRIPTION OF THE DRAWINGS

FIG. 1 is an isometric view of a butterfly valve according to the present invention.

FIG. 2 is an enlarged fragmentary view in cross section taken on line 2—2 of FIG. 3.

FIG. 3 is a partial front view of the valve of FIG. 1, with certain portions broken away.

FIG. 4 is an exploded isometric view with the body shown broken and other parts being omitted for clarity.

FIG. 5 is an enlarged fragmentary central sectional view taken along lines 5—5 of FIG. 3 with certain portions broken away.

FIG. 6 is a view similar to FIG. 5, illustrating a modified form of the invention.

DESCRIPTION OF THE INVENTION

An improved butterfly valve 20 in accordance with the present invention is shown in FIG. 1. The valve basically comprises a valve body 22, a seat assembly 24, a rotatably mounted butterfly disc 26, and a shaft 30 for rotating and retaining the disc in open or closed positions. Such a shaft is generally driven by an operator (not shown) usually driven by air, hydraulic or electric means well known in the art and not critical to the present invention, hence, a detailed description thereof is unnecessary.

Referring now to FIg. 3, it can be seen that the disc 26 is supported at its upper end by the shaft 30 rotatably mounted in a support 32 that is part of the valve body 22. The shaft 30 can be separated from the disc, enabling removal of the disc from the valve body. The disc is similarly supported at its lower end by a removable stud shaft 34 that is mounted in a housing 36 extending outwardly from the central or main portion of the valve body 22. The housing 36 has a removable end cap 38 which contains a ball 40 that is received in an indentation 42 in the base of the shaft 34. The bearing is axially adjustable by a screw 44 to center the disc 26 in the valve assembly 20 so that the disc weight does not affect the sealing ability when the valve is oriented in different attitudes. It will also be apparent that a single shaft extending downwardly through the disc 26 may be employed in place of shafts 30 and 34 previously described.

The entire valve assembly 20 is clamped between flanged pipe sections (not shown) in a conventional manner. A series of bolts passing through a series of aligned holes 46 located in a pair of circumferential flanges 48 and 50 of the valve body, seen in FIG. 1, 3 and 4, permits clamping of the valve between opposed flanges on the pipe sections to be joined.

IMPROVED VALVE SEAT

In FIG. 2, a typical cross section of the valve body 22 and the removable seat assembly 24 is shown. The seal assembly is comprised of a resilient seat 52 and two rigid backup segments 54 and 56 which will be described presently.

As seen in FIG. 2, the seat 52 has a base 58 and a pair of radial flanges 60 and 62 forming a U-shaped section. The radial flanges include a series of sealing ribs 64, 66 that project beyond the valve body flanges 48 and 50. These ribs are compressed by the flanges of the pipe sections to which the valve assembly is joined and form a seal therebetween.

The radial flanges 60 and 62 also include semicircular lugs 68 and 70 that are forced into corresponding grooves in the valve body by the face of the abutting flanges of the pipe sections (not shown). The function of the semicircular lugs 68 and 70 is to lock the seat assembly to the valve body without the use of adhesives, permitting simplified removal. An additional feature of the lugs is the retention of the resilient seat from the valve body in both vacuum and pressure service. Additionally, the manner of sealing accomplished by the ribs 64 and 66 and the semicircular locking lugs 68 and 70 prevents leakage from the atmosphere from entering behind the seat and consequently forcing the seat outward from the valve body when the valve is operated in a vacuum.

Ballooning of resilient seats is recognized by the industry as a major factor in limiting service range and causing failures in butterfly valves. Ballooning results in distortion and displacement of the resilient seat from the valve body. A second and somewhat similar problem is distortion or flowing of the resilient seat as the disc engages the seat during closing.

The seat assembly of the present invention overcomes these problems by providing a centrally located annular rib 72 that engages a cooperating bedgroove 74 in the valve body 22, as seen in FIGS. 2 and 4. The sides of the ribs 72 are in firm engagement with the bedgroove 74 while the top of the rib is spaced from the bottom of the bedgroove an amount indicated at G in FIG. 2. This arrangement provides lateral stability of the resilient seat, preventing excessive lateral distortion due to the high pressure and velocity fluid flow. The clearance indicated at G which is in the order of ten-thousandths of an inch for a 30-inch diameter valve permits expansion of the resilient seat 52 into the bedgroove as the disc 26 (indicated in phantom line) is rotated into the closed position. This expansion reduces the closing force on the disc and reduces the lateral distortion of the seat by permitting a radial expansion of the resilient seat material. Consequently, a seat material of somewhat higher durometer hardness can be employed further reducing the tendency of the seat 52 to distort under extreme service conditions.

Another major area in which failures are common is at the stem that supports the disc 26. Here again, ballooning is a serious problem compounded by rotary deflection of the seat caused by friction of the stem and drag on the seat by the disc in this area. A prior solution to this problem and the ballooning and distortion of the remainder of the resilient seat was solved in part by providing the entire seat with a rigid mounted backup ring. This previous method has provided a satisfactory solution of the problem in smaller size valves. However, when applied to 3 foot and larger diameter valves, the forces required to compress the seat assembly for insertion become prohibitively large for field replacement and repair.

As mentioned previously, the seat assembly 24 of the present invention comprises rigid backup segments 54 and 56 bonded to the valve seat 52. Referring to FIG. 3, the segments are located at the top and bottom of the seat assembly where the shafts 30 and 34 pass through the resilient seat. The segments may be constructed of any rigid material (steel, plastic, etc.) suitable for bonding with rubber. The size of the segments is determined by the size of the shafts 30, 34 and the bosses 80, 82 on the discs which receive them. The segments have flat bottom portions that correspond to the flattened area 84, 86 of the seat and are bonded thereto resulting in a uniform cross section of resilient seat material, best seen in FIG. 4. The top and bottom surfaces of the disc 26 are flat and are effective to uniformly compress the seat 52 in the flattened area in both the open and closed positions so that a uniform percentage of seat compression is obtained resulting in a uniform pressure retention capability.

The backup segments 54 and 56 generally have the shape of the segment of the cylinder. As best seen in FIG. 4, each of the segments further include a central blocking rib 88, coextensive with the annular rib 72 on the resilient seat 52. The ends of the locking rib may be squared off as indicated at 90 and the annular rib 72 is then correspondingly notched as seen at 92. This construction permits the thickness of the body of the resilient seat to be maintained uniform and due to the bonded joint between the segments 54, 56 and the seat 52 any torsional forces in the seat are restrained by the large surface of the segments and transmitted to the body of the valve through the locking rib 88.

Another advantage of employing the backup segments is simplification of the valve body construction. The employment of the segments only in the area 84, 86 where the seat is flattened permits machining of the interior surface of the valve body and bedgroove as a smooth cylinder rather than requiring special operations to form flattened areas on the body interior corresponding to the seat.

A further advantage of employing the segments is illustrated in FIG. 5. Since the segment is made from a rigid material it is possible to form a groove 94 therein adapted to receive an O-ring 96. Although sealing is accomplished between the resilient seat 52 and the shaft 30, the O-ring 96 provides additional sealing protection to prevent fluids from leaking up along the shaft 30 under extreme pressure service.

A still further advantage in employing the relatively small backup segments is ease of installation. Since the majority of the seat assembly 24 is flexible, only the top and bottom sections being rigidly supported, little force is required to deform the seat for installation into the bed and locking grooves on extremely large diameter valves.

A modified form of a resilient seat 100 is illustrated in FIG. 6. The seat 100 is substantially similar to the seat 52 previously described. Here the radial flanges 102 and 104 which form the U-shaped cross section have tapered interior surfaces 106 and 108. It has also been found that employment of square shaped locking lugs indicated at 110 and 112 are effective in retaining the seat 100 against the valve body 22'.

Installation of the seat assembly 24 is accomplished in the following manner. After the valve assembly has been removed from the pipeline and the disc and old seat have been removed, a short section of rod or tubing in inserted through the holes in which shafts 30 and 34 are later installed. Insertion of these rods or tubes act as a centering device to center the segments in line with the holes for the shafts 30 and 34 in the bosses 32 and 36 of the valve body. The new seal assembly 24 is there compressed at the sides midway between the rigid segments 54 and 56 and the seal is then slipped into the valve body and the locking rib 72 and 88 are inserted in the bedgrooves 74. The seat assembly is then released and allowed to expand outwardly against the valve body. The locking lugs are then firmly pressed into engagement with their recesses in the valve body. After the seat assembly 24 has been inserted in the valve body the seat assembly is firmly seated against the body by tapping with a mallet to insure full engagement. The balance of the valve parts are reassembled and valve assembly 20 is reinstalled in the pipeline. The compression of the flanges on the pipeline against the sealing ribs insure an adequate seal between the flanges and the valve body and the retention of the resilient seat against the valve body 22.

Although the best mode contemplated for carrying out the present invention has been herein shown and described, it will be apparent that modification and variation may be made without departing from what is regarded to be the subject matter of the invention.

What is claimed is:
1. A butterfly valve, comprising:
 a. an annular valve body with an internal wall surrounding and defining a flow passage through the valve, said internal wall having an annular bedgroove for accepting and holding a valve seat rib;
 b. an annular valve seat of resilient material surrounding the flow passage and positioned against the internal wall of the valve body, said seat having a pair of diametrically opposed and generally semicircular locking ribs extending radially outwardly into the valve body's bedgroove to prevent distortion of the seat, the ribs having a radial dimension less than the depth of the bedgroove to provide a void between them and the bedgroove for receiving seat material displaced outwardly when the valve is closed;

c. a valve disc supported within the seat by shaft means passing through the seat into the valve body; and d. a pair of rigid backup segments intermediate the seat and the valve body where the shaft means passes through the seat, each of said segments being bonded to the seat and having a radial locking rib extending outwardly into the valve body's bedgroove to prevent movement of the segment and distortion of the seat bonded thereto when the valve is opening or closing, said segments interfitting with the valve seat so that the ribs of the segments and of the seat are coextensive.

2. A butterfly valve according to claim 1 wherein the backup segments have radially outer arcuate surfaces that extend between the corresponding outer surfaces of the valve seat and the disc-supporting shaft means.

3. A butterfly valve, including:

a. a valve body having a circular internal wall surrounding a flow passage through the body, the internal wall of said valve body being formed with an annular bedgroove centrally located in the internal wall and opposed mounting faces having a peripheral locking groove formed in each face, b. an annular resilient seat positioned against the internal wall of the valve body, said seat having a central annular rib that engages the bedgroove in the valve body, said annular rib on said seat being not as deep as said bedgroove thereby providing a void therebetween to permit expansion of the resilient seat into the void upon rotation of the disc into the closed position, said seat also having a U-shaped cross section formed by radial flanged having locking lugs engaging the peripheral locking grooves in the faces of the valve body, c. a valve disc within the seat, said disc being supported by shaft means passing through the seat into the valve body at its top and bottom, and d. rigid backup segments between the seat and the valve body where the shaft means passes through the seat, said segments being bonded to the seat and having a centrally located rib that engages the annular bedgroove and is coextensive with the seat's central annular rib to prevent movement of said segments and distortion of the seat bonded thereto during opening or closing of the valve.

\* \* \* \* \*